UNITED STATES PATENT OFFICE.

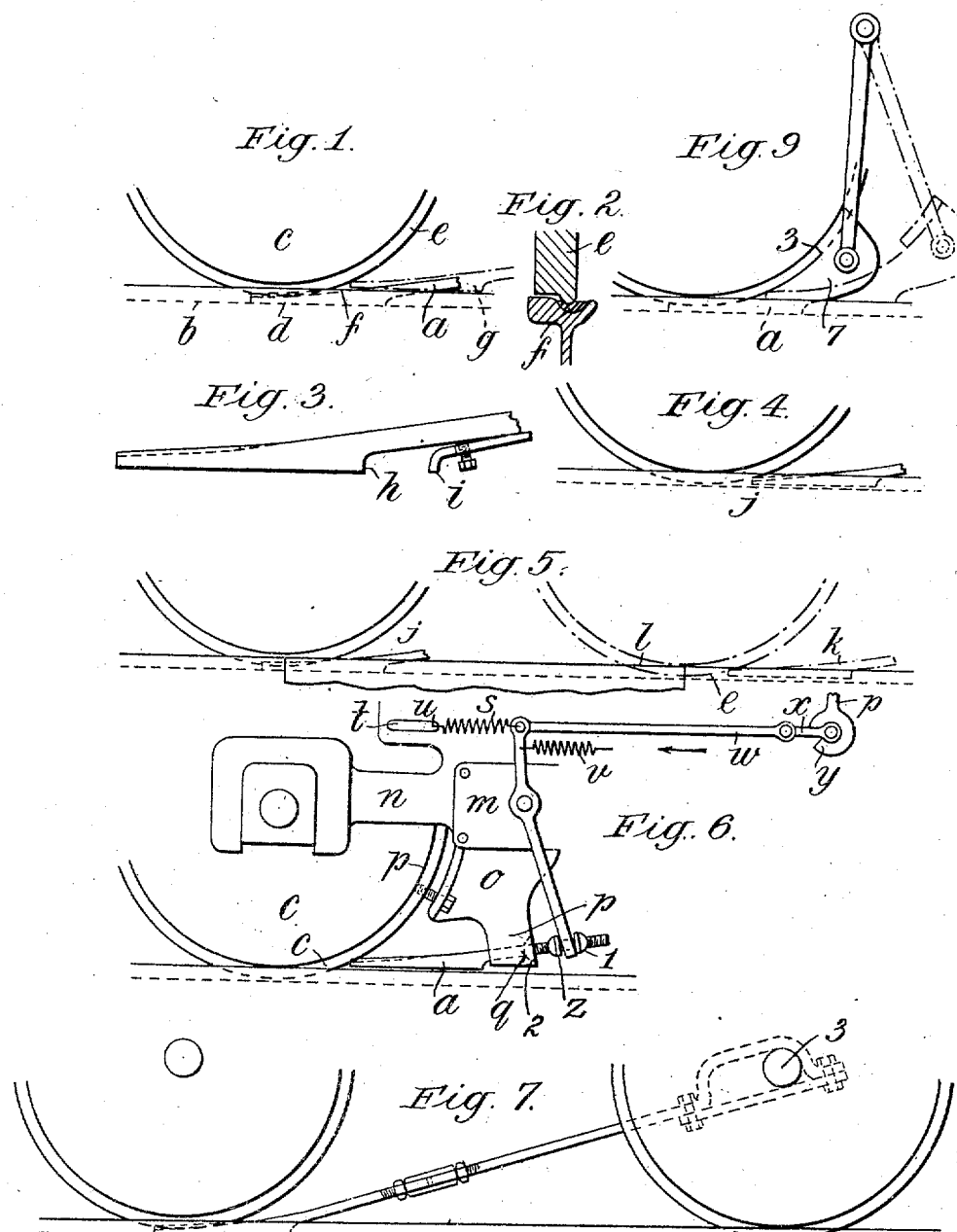

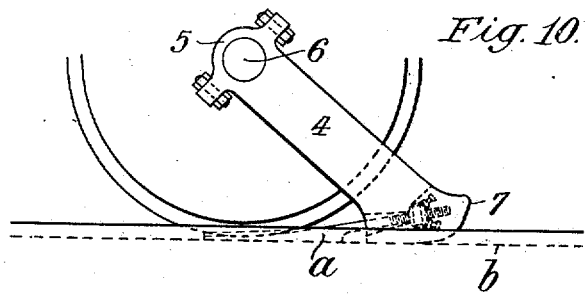
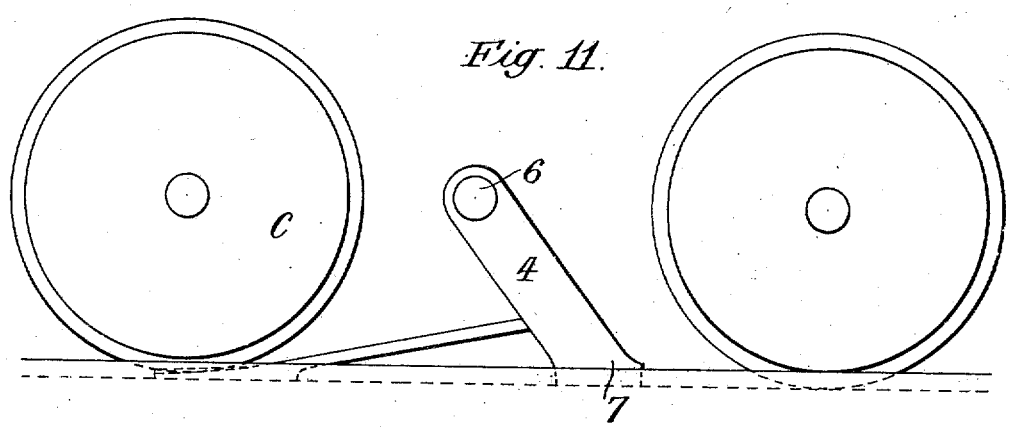
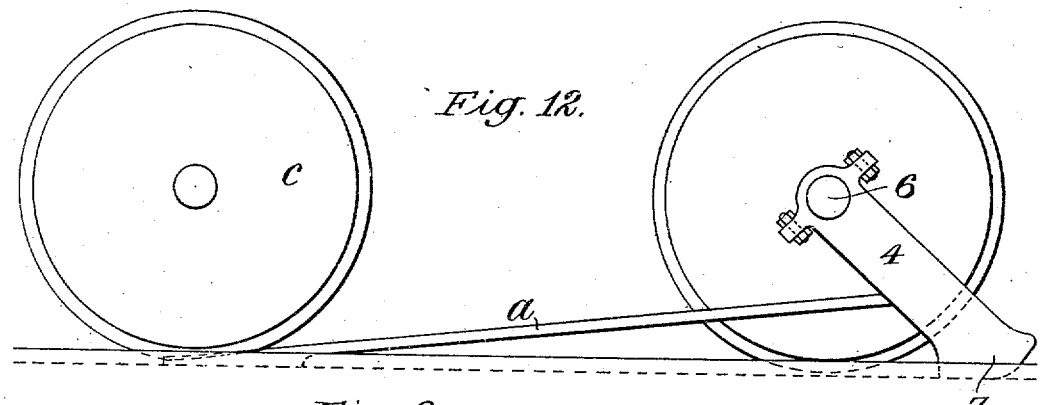
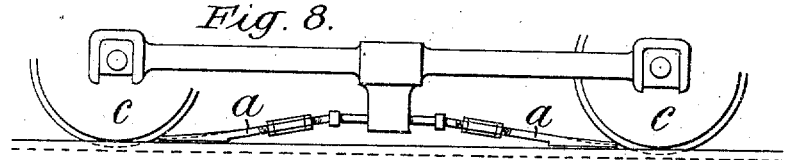

PERCIVAL J. PRINGLE, OF SIDMOUTH, ENGLAND.

BRAKE FOR TRAMWAYS AND RAILWAYS.

956,826.  Specification of Letters Patent.  Patented May 3, 1910.

Application filed July 12, 1907. Serial No. 383,509.

*To all whom it may concern:*

Be it known that I, PERCIVAL JOHN PRINGLE, a subject of His Majesty the King of England, residing at Sidmouth, in the county of Devon and Kingdom of England, have invented certain new and useful Improvements in Brakes for Tramways and Railways, of which the following is a specification.

This invention consists of a mechanical form of brake for use, generally in times of emergency.

It consists in utilizing the groove of the ordinary rail for the braking surface, either alone or in conjunction with some portion or all of the remaining top surface of the rails.

I will now describe my invention with reference to the accompanying drawings which are more or less diagrammatic and show only so much of the vehicle wheel and truck and rail as is necessary for elucidation, and wherein:—

Figure 1 is a side elevation showing the skid in the operative position in full lines and in the inoperative position in dot-and-dash lines. Fig. 2 is a cross section of Fig. 1. Fig. 3 is a side elevation of the skid illustrating a cleaning attachment therefor. Fig. 4 is a side elevation of the skid in the inoperative position. Fig. 5 is a side elevation showing in full and dot-and-dash lines two operative positions of the skid. Fig. 6 is a side elevation of the skid combined with a wheel brake-block, and of means for operating them. Fig. 7 is a side elevation of another form of skid. Fig. 8 is a side elevation representing skids applied to both front and rear wheels. Fig. 9 is a side elevation of an arrangement of combined skid and wheel brake block, the full lines indicating the working position and the dot-and-dash lines the inoperative position. Fig. 10 is a side elevation representing one arrangement of combined skid and track brake block. Fig. 11 is a side elevation of another arrangement of combined skid and track brake block. And Fig. 12 is a side elevation of yet another arrangement of combined skid and track brake block.

In one form I may employ a tapered bar $a$ of suitable material shaped to the section of the rail groove $b$, which normally is held in advance of one of the rotating car wheels $c$, with the tapered end $d$ pointing toward the wheel and parallel to the rail groove and just clear of same. This bar $a$ at the end remote from the tapered part $d$ is suitably attached to the car or car truck; at the same time the bar $a$ as a whole, or some part of it, can be given a longitudinal movement before its attachment can exert a direct pull on the car or truck.

There are some suitable means of quickly advancing the tapered bar $a$ through the longitudinal movement allowed it, and this movement is such as will advance the tapered bar, normally clear of the wheel $c$ and rail, to a position bearing upon the bottom of the rail groove $b$ and directly under the wheel flange $e$, so that the flange $e$ will ride over the tapered bar $a$ and transfer to same the weight of the car on this particular wheel $c$. As soon as the weight of car wheel $c$ is transferred to the tapered bar $a$ and the revolving wheel locked, an immediate and powerful longitudinal pull is exerted on same, so as to reduce the effect of this sudden strain on the bar and its attachment to the car or truck, a suitable form of spring, rubber, or other means acting as a buffer, may be interposed in some portion of the bar $a$ or at its point of attachment. One method of advancing this tapered bar $a$ is by means of a lever acting directly on same and operated by the driver, or a spring or other suitable means may exert a force to do this, and the releasing of this force be under the control of a hand or foot lever operated by the driver. On the weight of the car being released from the tapered end, means are provided for moving the tapered bar $a$ back to its normal position, and in the case of the spring or other means being used, the resetting of same so that the brake can be again applied when necessary.

The skid $a$ is made of a tough quality of iron or steel and if softer than the material of rail will "bite" the surface of same and give a greater co-efficient of friction. The top face of skid $a$ has a groove formed in same as at $f$ into which the flange $e$ of wheel $c$ drops. The skid $a$ is of such a thickness and is only allowed to travel sufficiently far under the wheel $c$ so that the flange $e$ does not become entirely removed from the groove $b$. This fact, in addition to the groove $f$ in skid $a$ give ample guide to the flanges $e$ and therefore provision against derailment. The sloping face $g$ allows skid to rise over any obstructions in its path. If this brake is used only on gradients, more or less steep, the rail groove $b$ is generally free from much dirt and this design of skid *a* would be suitable. When however there is much dirt in the groove *b* especially if this is in a hard dryish state, it becomes advantageous to get the maximum braking effect to clean the groove somewhat. To effect this the skid *a* may be shaped as at *h* or a cleaning strip fixed in advance of skid wherever most convenient. The strip *i* shows one method. By adopting the latter, should the skid meet with any serious obstruction such as running through a point, the strip *i* bends up without any damage otherwise being done.

The position of skid when out of use, shown by dotted lines, allows it to clear points and similar obstructions.

In ascending steep gradients it may be desirable for the skid *a* to be dropped before the ascent is made, and in the event of the vehicle or vehicles running backward for the skid *a* to come automatically into action. To effect this a third position is given to the skid as shown as *j*, Fig. 4.

When the skid *a* is advanced or released by the interposition of a spring or other suitable means it would only advance as far as *j*. This prevents the skid tip *d* pressing by means of its full weight on the groove surface *b*, and so allow it to suitably trail behind the wheel *c* when advancing up the gradient. On the vehicle or vehicles commencing to run back, the wheel flange *e* nips the skid *a* sufficiently and then draws it into the position shown in Fig. 1, distending the spring in so doing. This has also the advantage that should skid *a* be in action when traveling through a point as at Fig. 5, that as soon as the wheel flange *e* effects no pressure on the skid *a* that the spring will pull back the skid as shown at *k* so that it does not get jammed against the edge *l* of point. It is preferable to have these skids *a*, either connected in pairs or each skid of the pair separate from one another but operated from the same source. The two skids or pair of skids operate on the two wheels of one axle so that the retarding force is about equally applied on each side of the car.

There are means of adjustment provided so that the skids *a* can be advanced when wear on them has occurred or advanced and set back so that the weight of the car can be divided between the skids and each operate with approximately the same retarding force.

By utilizing the groove *b* as a braking surface in the manner described I obtain a much more powerful effect than a slipper or track brake applied to the tread of the rail. The surface of the groove is generally rough and rusty and contains dirt and grit, all of which tend to give a high coefficient of friction between the surface utilized.

The frequent greasy condition of tread surface seriously affects the efficiency of other brakes. In my brake, it is independent of tread condition.

When the tread is in a greasy condition, the dirt in the groove is generally soft and wet and the skid cuts through this and bears against the rail surface without materially affecting its efficiency.

The skid brake is not dependent on a supply of sand for its efficiency.

In other methods of braking as generally used, the skidding or locking of wheels of vehicles means a great diminution of the braking power, and in the case of electric brakes dependent for their electric power on the motor or motors revolved by the wheels, an entire cessation of the braking power. The skid brake is independent of skidded or locked wheels, in fact its operation is to skid or lock the wheels thereby utilizing this condition so dangerous to other methods of braking.

The skid brake can be practically instantly applied and at its full power. The skid brake can be arranged to automatically operate on a vehicle or vehicles running backward during the ascent of a gradient.

The skid may if desired operate on a part or all of the remainder of the top surface of the rail in addition to the groove.

The tapered part of skid in addition to being shaped to the section of the rail groove may be corrugated or shaped in any special way to increase the coefficient of friction between it and the surface of the groove.

The attachment in 4 wheel cars may be conveniently made to the axle of the adjoining pair of wheels or by means of a bracket bolted to the truck frame.

A compact arrangement as illustrated in Fig. 6 comprises a bracket *m* attached to the truck frame *n* closely adjoining the wheel *c* to be operated upon. The bracket *m* for a convenient distance toward the rail, follows the curvature of the wheel *c*, and has an adjustable screw or screws *o* fitted thereto so that the projecting ends of same would be directed toward and be almost in contact with the tread *p* of wheel. The tapered bar *a* passes through a suitable hole *q* in the bottom of bracket *m* so that it assumes the normal position previously referred to. It could be allowed the requisite longitudinal movement in this hole together with the buffer and adjusting arrangement before described.

By forming the bracket *m* in the above manner and causing the side of same adjoining the wheel to come in nearly close contact, through the agency of the screw or screws *o*, with the tread of wheel *p*, the strain and pull thrown on tapered bar *a* when the brake is operated, is partly counteracted by the screw or screws *o* pressing on the tread of wheel $p$ (due to the springing of the bracket toward the wheel under the strain) and so relieving the bracket $m$ of a portion of the strain.

Fig. 6 also shows a simple hand-operating means comprising a lever $r$. By pulling lever $r$ the skid $a$ is advanced so that it will just be jammed by the wheel flange $e$ as described in Fig. 4. On the wheel $c$ further revolving it will draw skid $a$ right under wheel flange $e$ distending a spring $s$ suitably.

The loop $t$ of the spring $s$ is of such a length that no pull is exerted against the stop $u$ and therefore no distension of the spring takes place until the skid is in the first jammed position referred to above.

Obviously a spring or other means may be so applied such as $v$ so that the skid $a$ may be advanced almost instantly. To effect this the lever $r$ is loose from $w$ and on pulling the lever $r$ in the direction of the arrow, its stop-piece $x$, moves $w$ until it has got the other side of dead center, when the spring $v$ can exert its full power and almost instantly apply the skid. To reset the skid the lever is moved in the reverse direction and the stop piece $y$ then forces $w$ back to position shown. The lock nuts $z^1$ allow the screwed end of skid to be advanced or withdrawn for adjustment purposes or to take up any wear on the skid. The nut $z$ is cup-shaped and bears against a similar shaped recess 2 in bracket $m$. An india-rubber washer may be placed between these faces to deaden the blow. The hole $q$ is slotted sufficiently for the skid to adjust itself to the varying diameter of the flange as it wears.

A mode of attaching to the adjoining wheel axle is shown in Fig. 7 which explains itself. Provision must be made for lubricating the bearing part 3.

The advancing of the skids may instead of being operated by hand, be effected automatically. One method might provide for the car wheels or the car when traveling beyond a certain speed, operating the skids through a suitable device.

Where it is required to give an emergency brake for the car traveling in either direction, it may be necessary to provide skids operating in both directions. One form of this is represented in Fig. 8. The skids may be arranged to act on the rear wheel only or they may be arranged to act on both the front and rear wheels.

Fig. 9 illustrates the combination with the skid $a$ of a block 7 for braking the tread of the wheel when the skid comes into operation.

The skids are attached to the car or car truck, and any pull there may be on the skids is transmitted to this point of attachment. I may utilize this pull on the skids to operate a further brake or brakes.

In one form I, as shown in Fig. 10, use a bar 4, one end of which terminates in a bearing block 5 and is free to revolve around the axle 6 or some other equivalent portion, adjoining the wheel on which the skid $a$ operates, and the other end is shaped in the form of a shoe 7, and can, when desired, be brought to bear either on the groove $b$ of the rail, or on some portion, or all of the remaining surface of the rail, or on the two conjointly. When the bar 4 is in contact with the rail, it takes up a sloping position in advance of the wheel to be operated upon. The skid $a$ is suitably held attached, or pivoted to this sloping bar as shown. Normally this bar 4 is revolved around its center 6 sufficiently to keep the skid $a$ from being gripped by the advancing wheel. On lowering the bar in any suitable or convenient manner, the skid $a$ becomes drawn under whatever portion of the wheel it is arranged to be in contact with. The pull now exerted on the skid $a$ is transmitted to the sloping bar 4, and results in two forces, one causing the shoe to be forced downward on to the rail, and the other, to give an upward pressure against the axle or to whatever part the bar may be pivoted. The surface and material of the shoe may be of any suitable substance and the front part of the shoe is rounded so as to have no tendency to catch in any part of the rail system. Obviously as shown in Fig. 11, this bar 4 may revolve around a pivot 6 attached to some suitable portion of the car or truck instead of the axle as described. By suitably arranging the pivot of the bar 4 longitudinally of the vehicle the weight of the car thereon may be regulated. The farther away the pivot of the bar 4 is from the axle 6 the greater will be the proportion of the weight of the car utilized for downward pressure on the skid $a$ and shoe 7. For instance, if the car or vehicle is on a 4 wheel truck and the skid is arranged to operate on the rear wheel, the bar 4 may as shown in Fig. 12, be pivoted on to the front axle of its equivalent 6, and the skid $a$ connected thereto in the manner previously described with suitable arrangements for advancing and removing it from under the wheel. In this case the downward pressure exerted on the shoe would utilize a proportion of the weight on the front axle, while the skid would utilize the whole of the weight on the rear wheel and a more powerful braking effect would be obtained. I may also utilize the pull on the skid $a$ to operate a brake block or blocks bearing on a wheel or wheels other than the one being skidded, and these may be the existing hand or power worked brake blocks or ones specially fitted, or, I may utilize the pull to operate the ordinary mechanical slipper brake or one of a similar design specially fitted for this purpose. In this latter arrangement, it may be preferable for the skid $a$ to be able to immediately operate the slipper independently of any arrangements there may be for working it by hand or power. The hand or power application could then be made to supplement that from the skid, or be used separately.

What I claim and desire to secure by Letters Patent of the United States is:—

1. The combination with a wheel of a tramway or railway vehicle, of a skid brake for co-acting in, and with, the rail groove only, and means for operating said skid, for the purposes specified.

2. The combination with a wheel of a tramway or railway vehicle, of a bar shaped to the general contour of the upper part of the rail groove to act with said groove only as a skid, and means for advancing and withdrawing said bar toward, and from, said wheel, for the purposes specified.

3. The combination with a skid brake co-acting in, and with, the rail groove and with a wheel of a tramway or railway vehicle, of another brake block operated by, and from, the skid, for the purposes specified.

4. The combination with a skid brake co-acting in, and with, the rail groove and with a wheel of a tramway or railway vehicle, of another brake block for acting upon another surface relatively to said skid, and a pivoted lever connecting said skid and block for operating said block from said skid, for the purposes specified.

In testimony whereof, I have hereunto subscribed my name.

P. J. PRINGLE.

Witnesses:
C. K. EDDOWES,
F. A. ROLLASON.